(12) United States Patent
Joshi et al.

(10) Patent No.: US 10,563,792 B2
(45) Date of Patent: Feb. 18, 2020

(54) ADAPTER FOR MOUNTING CABLE HANGERS

(71) Applicant: CommScope Technologies LLC, Hickory, NC (US)

(72) Inventors: Aviral Joshi, Chicago, IL (US); Ronald A. Vaccaro, Taylorsville, NC (US); Christopher Stockman, Joliet, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/982,690

(22) Filed: May 17, 2018

(65) Prior Publication Data

US 2018/0356004 A1 Dec. 13, 2018

Related U.S. Application Data

(60) Provisional application No. 62/516,254, filed on Jun. 7, 2017.

(51) Int. Cl.
| | | |
|---|---|---|
| *F16L 3/00* | (2006.01) | |
| *F16B 2/22* | (2006.01) | |
| *F16B 2/08* | (2006.01) | |

(52) U.S. Cl.
CPC ................. *F16L 3/00* (2013.01); *F16B 2/08* (2013.01); *F16B 2/22* (2013.01)

(58) Field of Classification Search
CPC .. F16B 2/08; F16B 2/22; F16B 21/088; F16L 3/00; F16L 3/137; F16L 3/233; A44B 11/06; A44B 11/006; H02G 3/263

USPC ......... 248/72, 74.3, 219.4; 24/464–465, 478, 24/23 R, 469, 468, 587.12, 265 R, 24/265 EC, 265 BC, 265 A
See application file for complete search history.

(56) References Cited

U.S. PATENT DOCUMENTS

| | | | | |
|---|---|---|---|---|
| 791,654 | A * | 6/1905 | Searle | ................... A41F 11/04 24/469 |
| 1,197,368 | A * | 9/1916 | Hausen | ................... A41F 11/04 24/469 |
| 3,232,568 | A * | 2/1966 | Lennon | ................... F16K 27/00 248/67 |

(Continued)

OTHER PUBLICATIONS

U.S. Appl. No. 15/081,177, filed Mar. 25, 2016.

(Continued)

*Primary Examiner* — Christopher Garft
(74) *Attorney, Agent, or Firm* — Myers Bigel, P.A.

(57) ABSTRACT

An adapter for mounting cable hangers to a mounting structure includes: a main panel having a hole therein; a pair of legs attached to and extending from the main panel, the legs having first and second ends; and a pair of fingers, each of the fingers having first and second sides, each leg being fixed at its first end to the first side of a respective leg. Each leg includes an engagement feature one its second side and each finger includes a mating engagement feature on its second end. In an unengaged condition, a gap is present between the second side of each leg and the second end of the corresponding finger, and in an engaged condition, the engagement feature of each leg is mated with the engagement feature of the corresponding finger, thereby forming a loop between the finger and the arm.

10 Claims, 6 Drawing Sheets

(56) References Cited

U.S. PATENT DOCUMENTS

| | | | | |
|---|---|---|---|---|
| 3,539,138 | A | * | 11/1970 | Desroches ............... F16L 3/00 248/62 |
| 3,624,813 | A | * | 11/1971 | Gaylord ................. B64D 17/22 294/82.29 |
| 3,912,329 | A | * | 10/1975 | Connors ............ A44B 11/2561 297/483 |
| 4,004,767 | A | * | 1/1977 | Chilton .................... F16L 3/00 248/58 |
| 5,177,837 | A | * | 1/1993 | Rekuc .................... A44B 11/00 24/198 |
| 5,706,560 | A | * | 1/1998 | Anscher ................ A44B 11/02 24/30.5 P |
| 6,622,976 | B1 | | 9/2003 | Ianello |
| 7,097,142 | B1 | * | 8/2006 | Schmidt .................... F16L 3/12 248/68.1 |
| 7,234,995 | B2 | * | 6/2007 | Fildan .................. A41F 15/002 24/198 |
| 8,191,836 | B2 | | 6/2012 | Korczak |
| 2002/0066833 | A1 | | 6/2002 | Ferrill et al. |
| 2005/0109887 | A1 | | 5/2005 | Catapano |
| 2006/0249633 | A1 | | 11/2006 | Korczak et al. |
| 2009/0294602 | A1 | | 12/2009 | Korczak |
| 2012/0073237 | A1 | * | 3/2012 | Brown ................... F24F 13/32 52/705 |
| 2016/0150873 | A1 | * | 6/2016 | Krpan ...................... A45F 5/02 24/3.12 |

OTHER PUBLICATIONS

U.S. Appl. No. 15/081,240, filed Mar. 25, 2016.
U.S. Appl. No. 15/335,614, filed Oct. 27, 2016.
Notification of Transmittal of the International Search Report and the Written Opinion of the International Searching Authority, or the Declaration corresponding to International Application No. PCT/US2018/032275 dated Aug. 27, 2018.

* cited by examiner

ADAPTER FOR MOUNTING CABLE HANGERS

RELATED APPLICATION

This application claims priority from and the benefit of U.S. Provisional Patent Application No. 62/516,254, filed Jun. 7, 2017, the disclosure of which is hereby incorporated herein in its entirety.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and/or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. The locking projections of a hanger are inserted into a hole in the antenna tower (typically in the leg of the antenna tower) to secure the hanger to the tower. Hangers can be "stacked" onto each other by inserting the locking projections of one hanger into the large aperture of the next hanger. One variety of cable hanger of this type is the SNAP-STAK® hanger, available from CommScope, Inc. (Joliet, Ill.). Other cable hangers are shown in U.S. patent application Ser. No. 15/081,177, filed Mar. 25, 2016, Ser. No. 15/081,240, filed Mar. 25, 2016, and Ser. No. 15/335,614, filed Oct. 27, 2016, the disclosures of each of which are hereby incorporated herein by reference in full.

Figure 1:
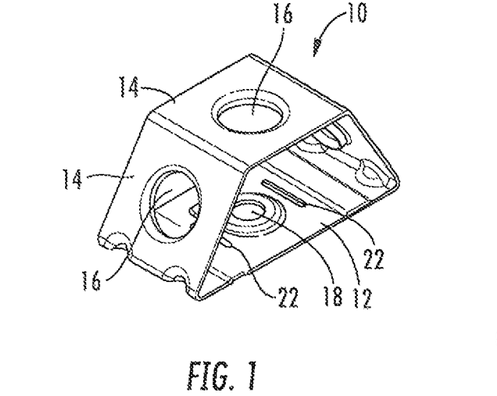
FIG. 1 is a perspective view of a prior art adapter for cable hangers.
Figure 2:
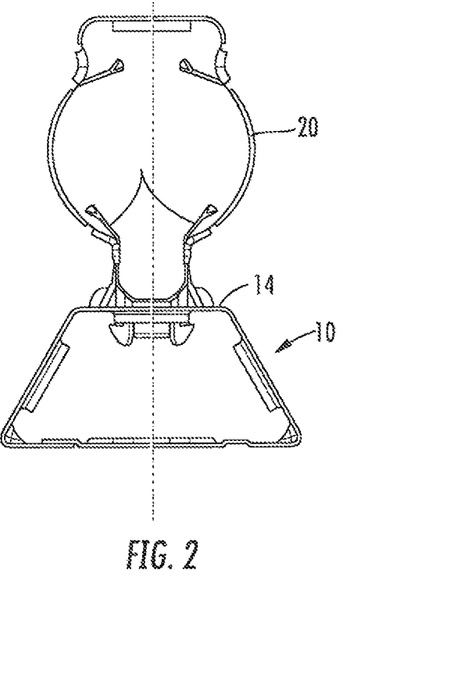
FIG. 2 is a top view of the adapter of FIG. 1 with a cable hanger mounted therein.
Figure 3:
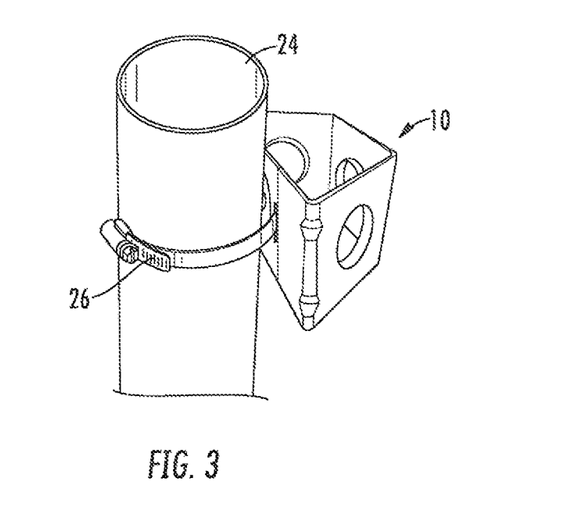
FIG. 3 is a perspective view of the adapter of FIG. 1 mounted to a pole via a hose clamp.

In some instances, it may be desirable to mount multiple stacks of cable hangers in close proximity. In such instances, it may be desirable to employ an adapter, such as that shown at 10 in FIG. 1. The adapter 10 has a trapezoidal profile, with a base panel 12 and three serially-attached mounting panels 14. Each of the mounting panels 14 includes a mounting hole 16 (typically a nominal ¾ inch hole) that can receive a cable hanger such as those described above, one of which is designated 20 in FIG. 2. The base panel 12 of the adapter 10 has a hole 18 that can be used to mount the adapter 10 to a mounting structure via a bolt. The base panel 12 also includes slots 22 on either side of the hole 18 that can receive a hose clamp 26 or the like to mount the adapter 10 to a pole 24, as shown in FIG. 3. This mounting approach may be desirable when the pole 24 has no pre-formed holes to receive a typical cable hanger.

It may be desirable to provide additional configurations for mounting cable hangers.

SUMMARY

As a first aspect, embodiments of the invention are directed to an adapter for mounting cable hangers to a mounting structure, comprising: a main panel having a hole therein; a pair of legs attached to and extending from the main panel, the legs having first and second sides; and a pair of fingers, each of the fingers having first and second ends, each finger being fixed at its first end to the first side of a respective leg. Each leg includes an engagement feature on its second side and each finger includes a mating engagement feature on its second end. In an unengaged condition, a gap is present between the second side of each leg and the second end of the corresponding finger, and in an engaged condition, the engagement feature of each leg is mated with the engagement feature of the corresponding finger, thereby forming a loop between the linger and the arm.

As a second aspect, embodiments of the invention are directed to the adapter discussed above in combination with a radial clamp that is routed under the main panel, through the loops, and over the fingers. In some embodiments, the radial clamp encircles a mounting structure.

As a third aspect, embodiments of the invention are directed to a method of mounting an adapter for a cable hanger on a mounting structure, comprising:

(a) providing an adapter comprising:
a main panel having a hole therein;
a pair of legs attached to and extending from the main panel, the legs having first and second sides; and
a pair of fingers, each of the fingers having first and second ends, each leg being fixed at its first end to the first side of a respective leg;
wherein each leg includes an engagement feature on its second side and each finger includes a mating engagement feature on its second end;
wherein in an unengaged condition, a gap is present between the second side of each leg and the second end of the corresponding finger;

(b) slipping a radial clamp into the gaps such that the radial clamp overlies the fingers and underlies the main panel; and (c) engaging the mating engagement feature on the second end of each finger with the engagement feature of each leg to capture the radial clamp.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 4:
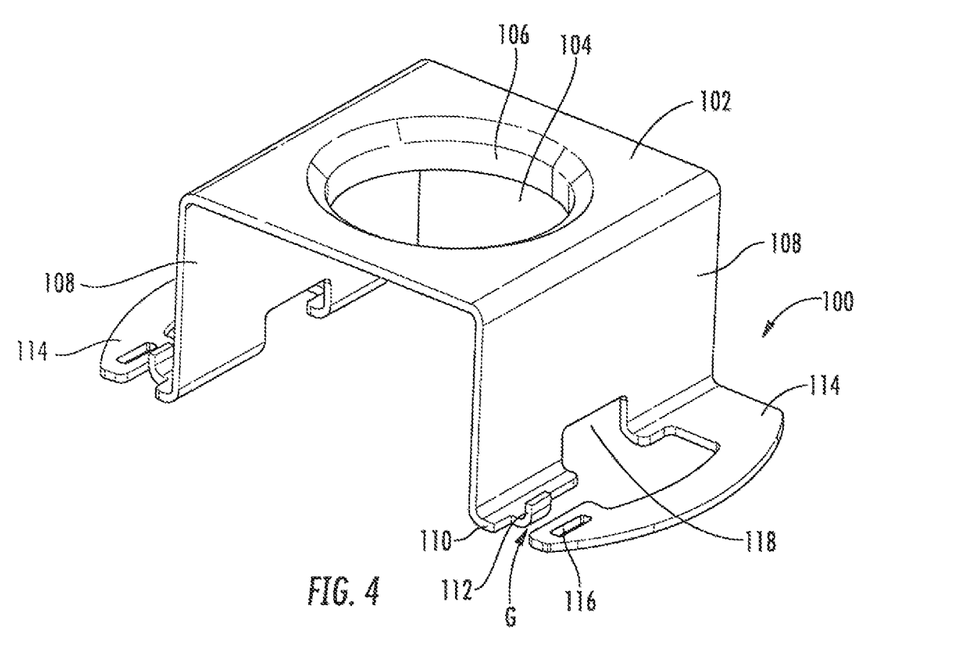
FIG. 4 is a right, top perspective view of an adapter for a cable hanger according to embodiments of the invention.
Figure 5:
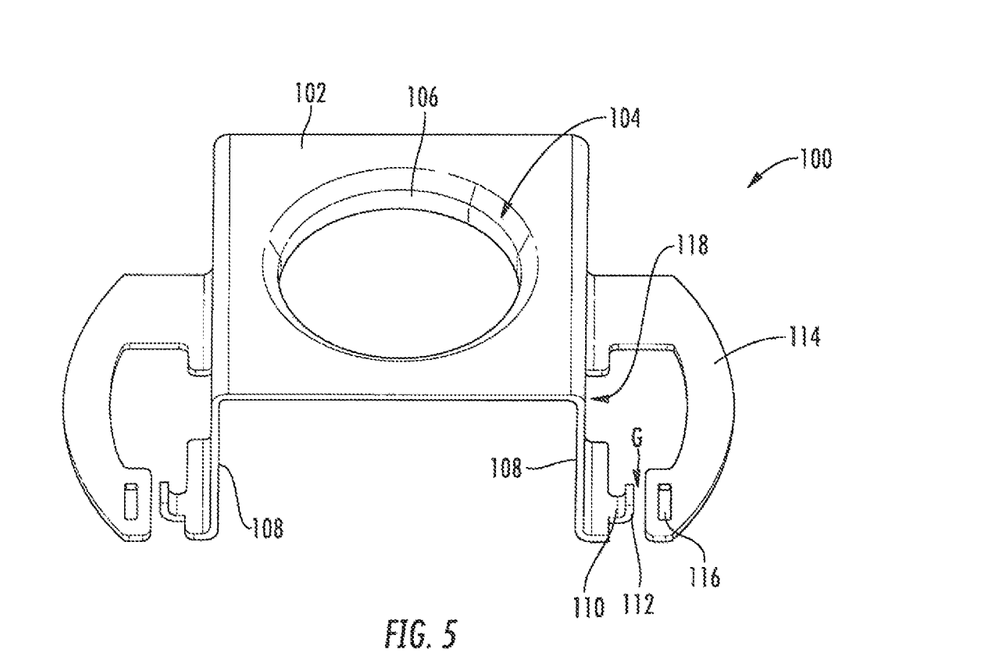
FIG. 5 is a top perspective view of the adapter of FIG. 4.

Referring now to FIGS. 4 and 5, an adapter for a cable hanger, designated broadly at 100, in shown therein. The adapter 100 includes a main panel 102 that is generally flat and square. A hole 104 is located in the center of the main panel 102; the hole 104 is reinforced with a rim 106. Legs 108 extend generally perpendicularly to the main panel 102 from opposite edges thereof. A short flange 110 with an upturned hook 112 extends laterally from one side of each leg 108. A finger 114 extends from the opposite side of each leg 108. The finger 114, which is generally flat, extends first laterally from the leg 108, then toward the flange 110, largely within a plane that is parallel with the main panel 102. The free end of the finger 114 includes a slot 116. A recess 118 is present in the edge of each leg 108 from which the flange 110 and finger 114 extend. As can be seen in FIG. 4, a gap G is present between the free end of each finger 114 and the adjacent hook 112.

The adapter 100 is typically formed of a metallic material, such as steel, and may be formed by stamping from a sheet of material. The adapter 100 is typically formed as a monolithic component.

Figure 6:
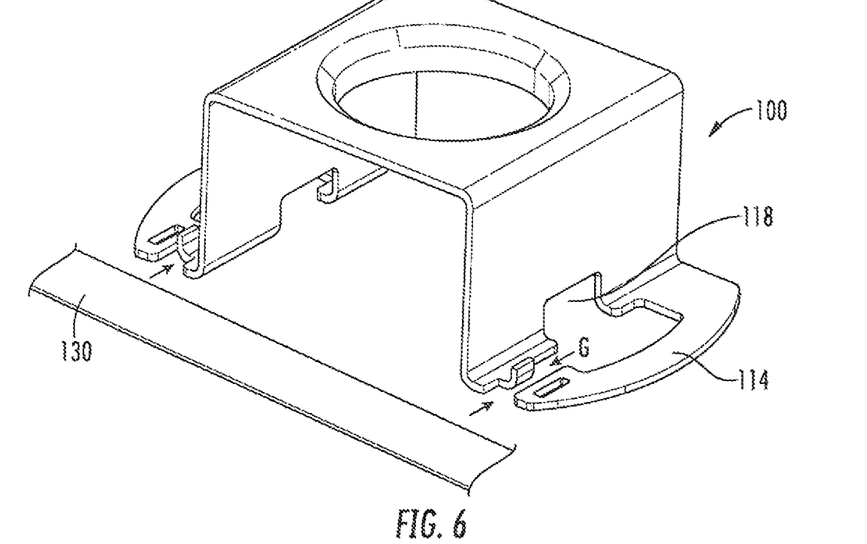
FIGS. 6 and 7 are right, top perspective views of the adapter of FIG. 4 showing how a hose clamp or other securing device can be used to mount the adapter to a mounting structure.
Figure 7:
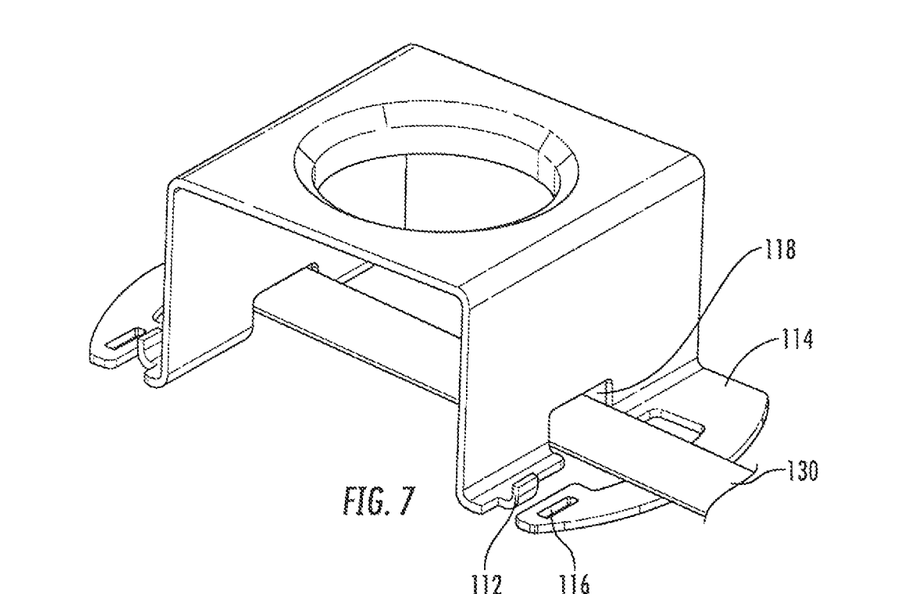

Referring now to FIGS. 6 and 7, the adapter 100 can be mounted to a mounting structure, such as a pole or leg of an antenna tower, via a hose clamp 130 or a similar radial clamp. The hose clamp 130 is routed under the main panel 102, through the recesses 118 in the legs 108, and over the fingers 114 (see FIG. 6). The fingers 114 can then be deflected upwardly and inwardly (i.e., toward the legs 108 and the main panel 102) to insert the hook 112 of each flange 110 into its associated slot 116. Deflection of the fingers 114 may be facilitated with the use of a screwdriver or other prying-type device. Insertion of the hook 112 into the slot 116 closes the gap G and forms a loop defined by the finger 114 and leg 108 that captures the hose clamp 130.

Although the hose clamp 130 can be detached from the mounting structure and threaded through the gaps G, one advantage of the adapter 100 is the ability to mount the adapter 100 in place on a mounting structure without detaching a hose clamp already mounted on the mounting structure. This can be achieved by orienting an positioning the adapter 100 so that the hose clamp 130 is adjacent the gaps G, then sliding the free ends of the fingers 114 under the hose clamp 130 while the legs 108 slide over the hose clamp 130 (see FIGS. 6 and 7). (It may be advantageous to loosen the hose clamp 130 somewhat). Thus, the adapter 100 can be added to a mounting structure to which other devices (e.g., other adapters) are already mounted with a hose clamp 130 without having to detach the hose clamp 130 from those other devices.

Once in place, the adapter 100 can be employed to mount cable hangers as described above and shown in FIG. 3: the locking projections of a cable hanger can be inserted into the hole 104 (conventionally nominally a ¾ inch hole) and additional cable hangers can be stacked in conventional fashion.

Figure 8:
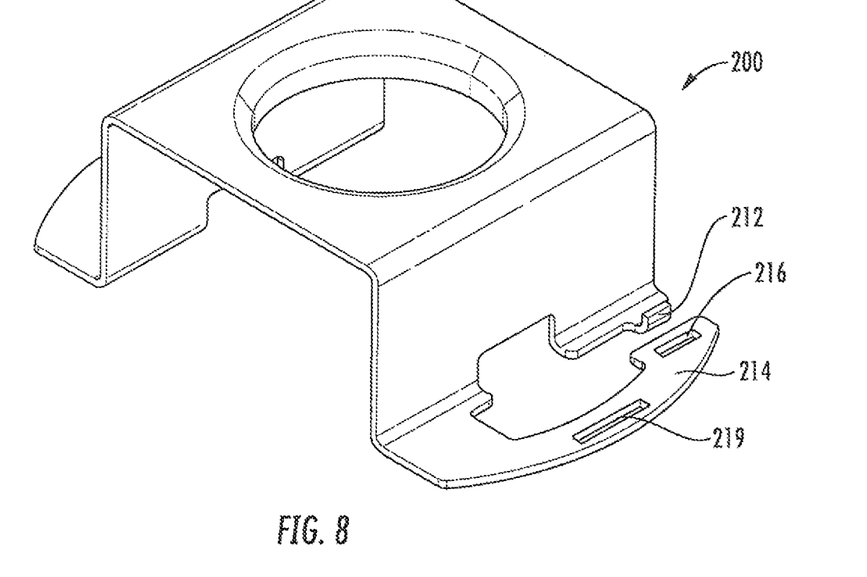
FIG. 8 is a right, top view of an adapter for a cable hanger according to additional embodiments of the invention.
Figure 9:
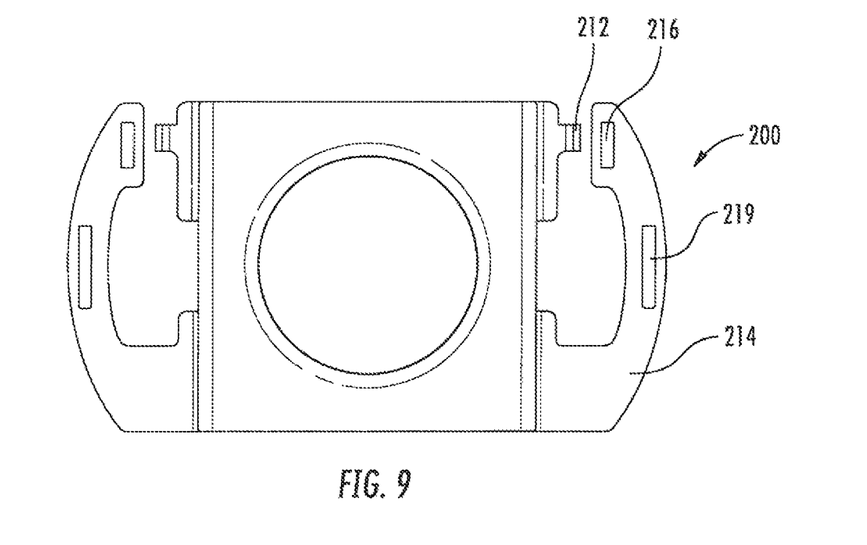
FIG. 9 is a top view of the adapter of FIG. 8.

The adapter may take different configurations. As an example, an alternative adapter 200 is shown in FIGS. 8 and 9. The adapter 200 is similar to the adapter 100 with the exception that the fingers 214 include a slot 219 in the central portion thereof. The slot 219 may be sized to receive the blade of a screwdriver to facilitate deflection of the fingers 214 as the hooks 212 are being inserted into the slots 216.

Figure 10:
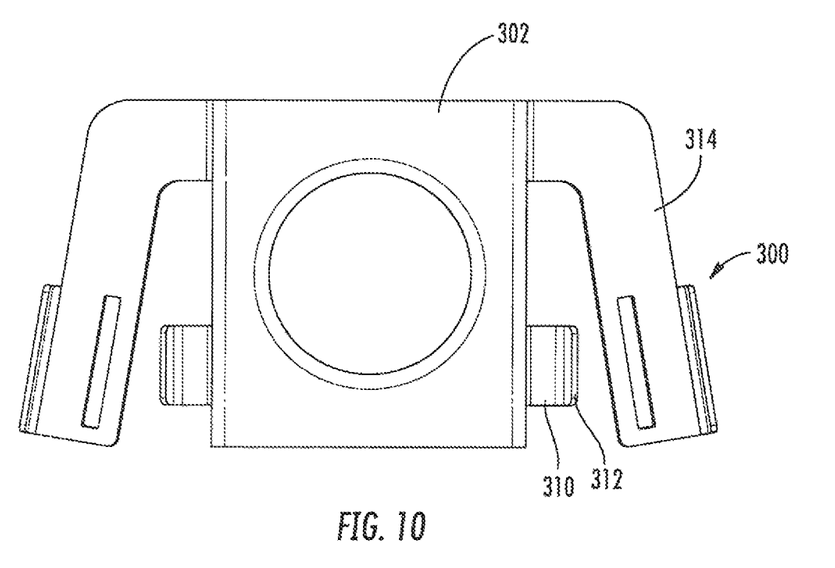
FIG. 10 is a top view of an adapter for a cable hanger according to further embodiments of the invention.
Figure 11:
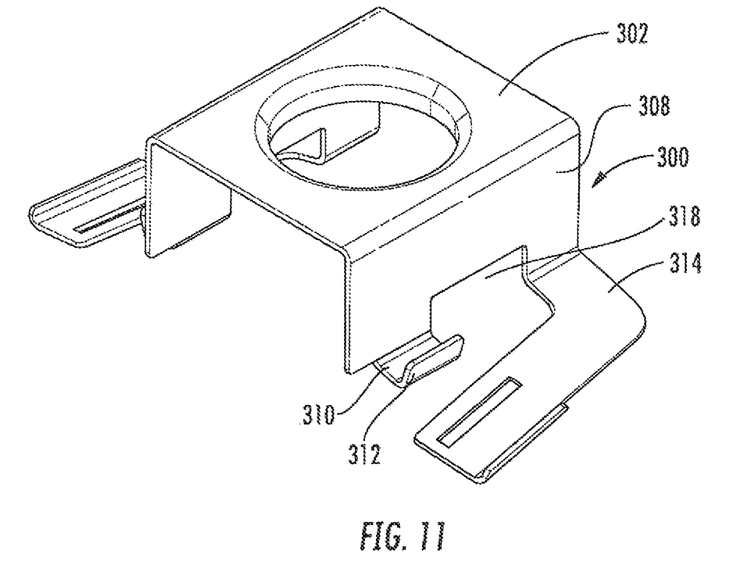
FIG. 11 is a right, top perspective view of the adapter of FIG. 10.
Figure 12:
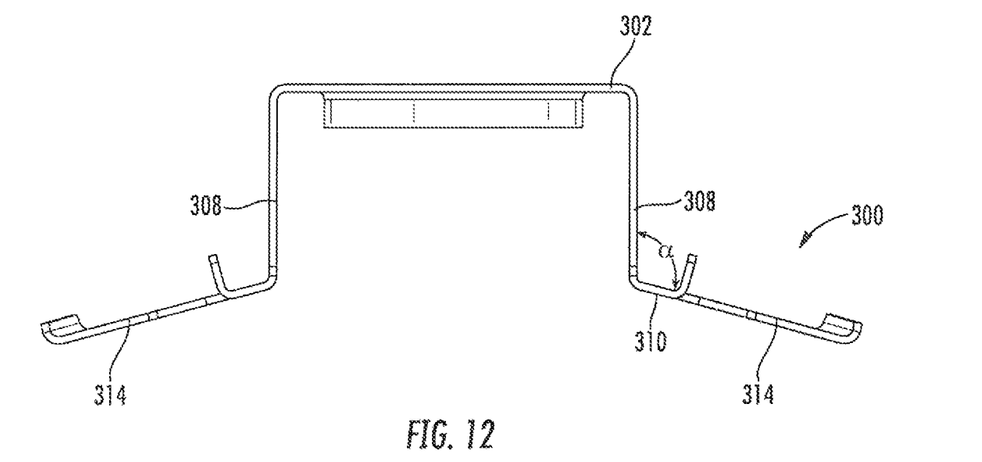
FIG. 12 is a front view of the adapter of FIG. 10.

Another embodiment of an adapter, designated broadly at 300, is shown in FIGS. 10-12. The adapter 300 is configured somewhat similarly to the adapter 100, with a main panel 302, legs 308 with recesses 318, flanges 310 and hooks 312, and fingers 314. However, the fingers 314 are configured somewhat differently. As can be seen in FIG. 10, the fingers 314 splay laterally from their fixed ends away from the flanges 310. Also, as seen in FIG. 12, the fingers 314 slope at a slightly obtuse angle α relative to the legs 308 (typically, the obtuse angle is between about 91 and 179 degrees). The sloping of the fingers 314 in this manner can help the adapter 300 to follow the surface of a curved mounted structure, such as a tower leg or pole, as it is mounted.

Figure 13:
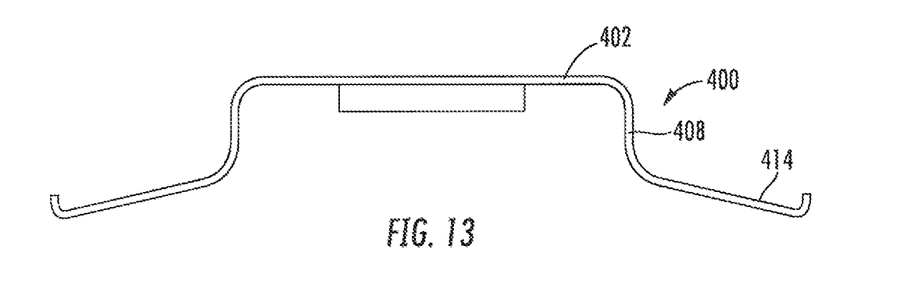
FIG. 13 is a front view of another adapter for a cable hanger according to additional embodiments of the invention.

Those skilled in this art will appreciate that the adapters described above may take different configurations. For example, the main panels are shown herein as being flat, but may have some contour (e.g., they may be slightly curved/convex to follow the contour of a round mounting structure). Similarly, the legs may be contoured/non-planar; for example, as shown in FIG. 13, the legs 408 of the adapter 400 illustrated therein may comprise portions of two merging radii (i.e., a "double-radius" configuration) that extend from the main panel 402 and the fingers 414. The recesses in the legs may be omitted, or may be shaped differently. The fingers may include a hook and the flange extending from the leg may include a slot that receives the finger's hook. In other embodiments, the hooks/slots may be replaced by other engagement features (e.g., a pin and a receiving hole, two interlocking hooks, a latch and an open-ended slot, etc.). The rim that reinforces the hole in the main panel may be omitted. In some embodiments, multiple holes may be present in the main panel; in such embodiments, the main panel may be angled (e.g., at 45-60 degrees) so that cable hangers inserted into the holes extend in different directions.

The invention being thus described, it will be apparent that the same may be varied in many ways. Such variations are not to be regarded as a departure from the spirit and scope of the invention, and all such modifications as would be obvious to one skilled in the art are to be included within the scope of the following claims.

That which is claimed is:

1. An adapter for mounting cable hangers to a mounting structure, comprising:
   a main panel having a hole therein;
   a pair of legs attached to and extending from the main panel, the legs having first and second sides; and
   a pair of fingers, each of the fingers having first and second ends, each finger being fixed at its first end to the first side of a respective leg, the second end of each finger being a free end;
   wherein each leg includes an engagement feature on its second side and each finger includes a mating engagement feature on its second end;
   wherein in an unengaged condition, a gap is present between the second side of each leg and the second end of the corresponding finger, and in an engaged condition, the engagement feature, of each leg is mated with the engagement feature of the corresponding finger, thereby forming a loop between the finger and the arm.

2. The adapter defined in claim 1, wherein the main panel is generally flat.

3. The adapter defined in claim 2, wherein the fingers are generally flat and generally parallel to the main panel.

4. The adapter defined in claim 1, wherein the leg engagement feature is a hook, and the mating engagement feature of the finger is a slot configured to receive the hook.

5. The adapter defined in claim 1, wherein the fingers are generally flat.

6. The adapter defined in claim 1, wherein each of the legs includes a recess in an edge opposite the main panel.

7. The adapter defined in claim 1, wherein the hole in the main panel has a nominal diameter of ¾ inch.

8. The adapter defined in claim 1, in combination with a radial clamp that is routed under the main panel, through the loops, and over the fingers.

9. The combination defined in claim 8, wherein the radial clamp encircles a mounting structure.

10. An adapter for mounting cable hangers to a mounting structure, comprising:
    a main panel having a hole therein;
    a pair of legs attached to and extending from the main panel, the legs having first and second sides; and
    a pair of fingers, each of the fingers having first and second ends, each finger being fixed at its first end to the first side of a respective leg, the second end of each finger being a free end;
    wherein each leg includes an engagement feature on its second side and each finger includes a mating engagement feature on its second end;
    wherein in an unengaged condition, each of the fingers and their respective leg are substantially coplanar, with the mating engagement feature of each finger extending out of a plane defined by the fingers, a gap is present between the second side of each leg and the second end of the corresponding finger, and in an engaged condition, the engagement feature of each leg is mated with the engagement feature of the corresponding finger, thereby forming a loop between the finger and the arm.

* * * * *